(12) United States Patent
Nakano

(10) Patent No.: US 7,680,279 B2
(45) Date of Patent: Mar. 16, 2010

(54) IMAGE DISPLAY SYSTEM

(75) Inventor: Masaki Nakano, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 1015 days.

(21) Appl. No.: 11/398,311

(22) Filed: Apr. 5, 2006

(65) Prior Publication Data

US 2006/0227970 A1  Oct. 12, 2006

(30) Foreign Application Priority Data

Apr. 6, 2005  (JP) ............................. 2005-109894

(51) Int. Cl.
*H04N 7/167* (2006.01)
(52) U.S. Cl. .................. 380/217; 380/210; 380/200
(58) Field of Classification Search ................ 380/217, 380/210, 200
See application file for complete search history.

(56) References Cited

U.S. PATENT DOCUMENTS

| 5,633,683 | A | 5/1997 | Rosengren |
| 6,819,765 | B1 | 11/2004 | Kori |
| 2004/0070620 | A1 | 4/2004 | Fujisawa |

FOREIGN PATENT DOCUMENTS

| CN | 1492677 | 5/2004 |
| CN | 1581946 | 2/2005 |
| EP | 0936813 | 8/1999 |
| EP | 1505834 | 2/2005 |
| JP | 3-040689 A | 2/1991 |
| JP | 5-316079 A | 11/1993 |
| JP | 2000-217079 A | 8/2000 |
| JP | 2000-324468 A | 11/2000 |
| WO | 02096097 | 11/2002 |

OTHER PUBLICATIONS

Partial-scrambling of images encoded using JPEG2000 without generating marker codes Kiya, H. Imaizumi, S. Watanabe, O. Dept. of Electr. Eng., Tokyo Metropolitan Univ., Japan; Image Processing, 2003. ICIP 2003. Proceedings. 2003 International Conference on Publication Date: Sep. 14-17, 2003 vol. 3, On pp. III-2; year 2003.*
Cryptanalysis of an Image Scrambling Scheme Without Bandwidth Expansion; Shujun Li; Chengqing Li; Kwok-Tung Lo; Guanrong Chen; Circuits and Systems for Video Technology, IEEE Transactions on vol. 18, Issue 3, Mar. 2008 pp. 338-349.*
A New Image Scrambling Algorithm Based on Queue Transformation; Hai-Yan Zhang; Machine Learning and Cybernetics, 2007 International Conference on vol. 3, Aug. 19-22, 2007 pp. 1526-1530.*
A new class of image registration for guaranteeing secure data management; Ito, I.; Kiya, H.; Image Processing, 2008. ICIP 2008. 15th IEEE International Conference on Oct. 12-15, 2008 pp. 269-272.*

* cited by examiner

*Primary Examiner*—David Y Jung
(74) *Attorney, Agent, or Firm*—Canon USA Inc IP Div

(57) ABSTRACT

An image control apparatus in an image display system applies scrambling only to image data which requires content protection and notifies to a display apparatus which pixel or pixels are scrambled. Alternatively, when a plurality of windows are displayed at the same time, the image control apparatus scrambles each window individually using a different key, and notifies to the display apparatus which scramble is applied to each pixel.

18 Claims, 10 Drawing Sheets

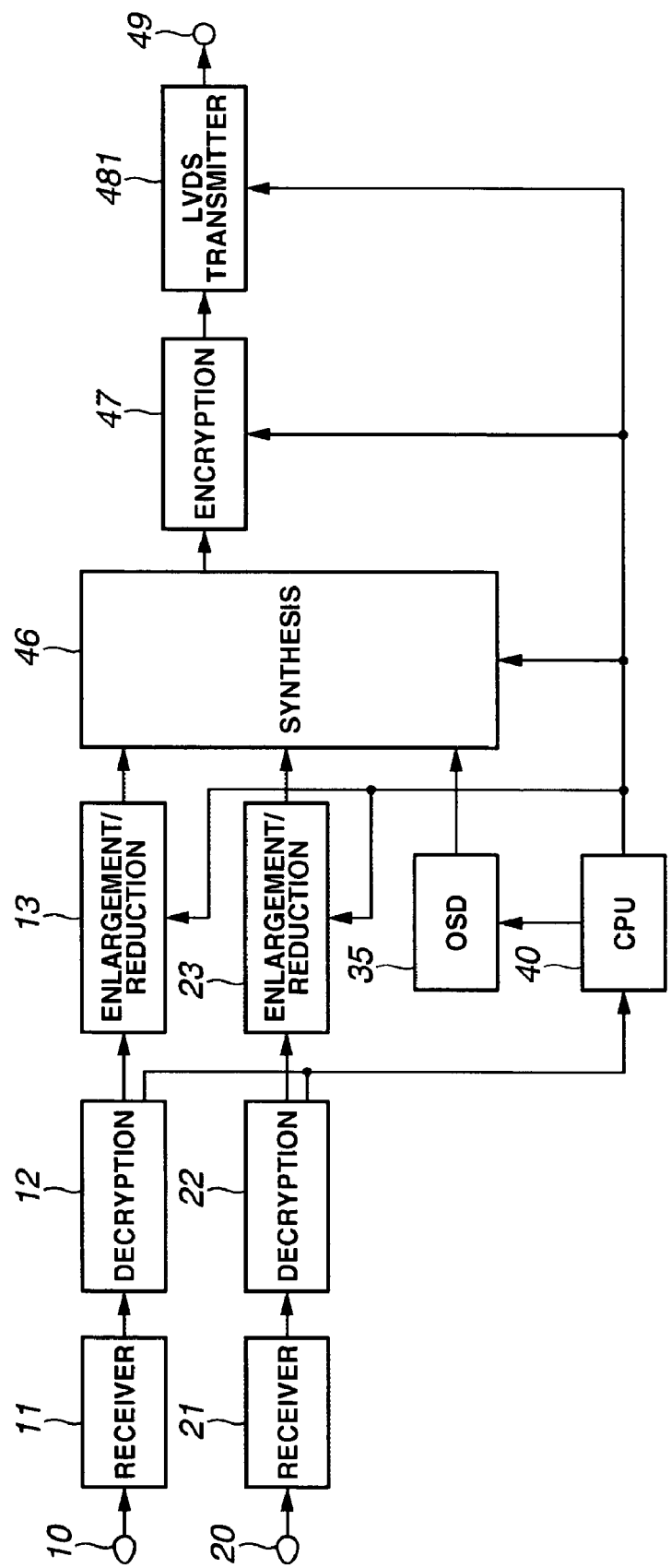

IMAGE DISPLAY SYSTEM

BACKGROUND OF THE INVENTION

1. Field of the Invention

The present invention relates to an image display system, and more specifically, relates to scramble processing of image data to protect content in a multi-image display.

2. Description of the Related Art

In recent years, in the field of AV equipment such as a video recording apparatus, broadcast monitors, and TV monitors, there has been a trend towards digitalization and higher resolution. As a result, illegal copying of copyright content has been perceived as a problem, and some sort of protection function has come to be employed. For example, when an image is output from a digital broadcasting tuner or a HD video recording apparatus to a TV monitor, a digital interface (I/F) having a content protection function referred to as HDMI (High-Definition Multimedia Interface) is used. Further, there is a model in which an image input processing unit and a display apparatus are placed in separate housings and the image is transferred from the image input processing unit to the display apparatus. Some sort of content protection for an image transfer is also required in such a model.

A TV monitor displays the image data input by this HDMI. Other types of TV monitor receive video input from a plurality of sources and can perform a multi-window display by scaling down the video inputs to arbitrary sizes, and displaying them on one screen at the same time. Japanese Patent Application Laid-Open No. 2000-217079 discusses content protection in a case where an image having protection and an image requiring no protection are multi-image synthesized at the image input processing unit and an image is transferred to a display apparatus. The image having protection and the image requiring no protection are multi-image synthesized so as to output the synthesized image to a display apparatus after protection is applied.

However, in the above case, if the image requiring no protection is input from an image source where the pixel data value of image data is known in advance, the type of data the known image data is converted into can be analyzed. Thus, the scrambling method of the image originally having protection can be found out. An image from the image source, in which the pixel data value of the image data is known in advance, is, for example, a pattern image from a test pattern generator. Generally speaking, sufficient encryption processing is performed in the authentication processing between equipment. However, in the case of uncompressed image data that requires the transmission of vast amounts of data in real time, complicated scramble processing is not possible. Hence, by analyzing the type of data the known image data is converted into, it is possible to illegally descramble the scrambled image data.

As a specific example, shown in FIG. 3, in the case of a system where a user can arbitrarily set up a window size, an image 3(a) having protection is slightly reduced (for example, approximately by 1%), and at the back of that image, an image 3(b) of a ramp waveform is disposed. As to the image 3(b), the value of the image data is incremented by for each pixel. Thus, synthesized image 3(c) is outputted. In a headmost line, the image data applied with a scramble is incremented as an address value in order and stored in a memory. Then, the relationship between the address and the data of the memory becomes the relationship between the scramble data and the original data, and thereby constitutes a data table for descrambling.

If the image data in the subsequent line is substituted one by one with reference to this data table, all scrambles are released, and the scramble of the image 3(a) requiring content protection is also released. Even in a case where the scramble method is changed at intervals of several frames, if a data table is prepared for descrambling for each frame, it is possible to descramble the scrambled image data.

SUMMARY OF THE INVENTION

According to an exemplary embodiment of the present invention, a scramble is applied only to the image data which requires content protection, or a different scramble is applied to each window. Information about what scramble is applied to which pixel, is separately transmitted according to the exemplary embodiment. As a method of transmitting information about a pixel applied with the scramble, coordinate information on the diagonal position of a rectangular area applied with the scramble is transmitted with a control code during a blanking period, or one bit signal showing the presence or absence of the scramble for each one pixel is added.

According to one aspect of the present invention, an image control apparatus synthesizing an image based on a plurality of video image sources and displaying the synthesized image on the display apparatus, includes an input unit configured to input a first video image source applied with content protection and a second video image source applied with no content protection; an image synthesizing unit configured to generate synthesized image data from the first video image source and the second video image source; a scramble processing unit configured to apply scramble processing to the synthesized image data corresponding to the display portion of the synthesized image based on the first video image source and configured not to apply the scramble processing to the synthesized image data corresponding to the display portion of the synthesized image based on the second video image source or configured to apply the scramble processing different from the scramble processing which is applied to the first image source; and an output unit configured to output the synthesized image data.

When the image control apparatus re-outputs an image which is area-division-synthesized from the image having content protection and the known image having no content protection, a scramble is applied only to the image data requiring content protection. Information which pixel the scramble is applied to, is separately transmitted to the display apparatus. Or a scramble is individually applied to each area and information relating to which scramble key is used on which pixel, is separately transmitted. Thus, it becomes possible to prevent the scrambled image being illegally descrambled.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a block diagram of the image control apparatus in a fifth exemplary embodiment.

DETAILED DESCRIPTION OF THE EXEMPLARY EMBODIMENTS

Exemplary embodiments of the invention will be described in detail below with reference to the drawings.

First Embodiment

Figure 1:
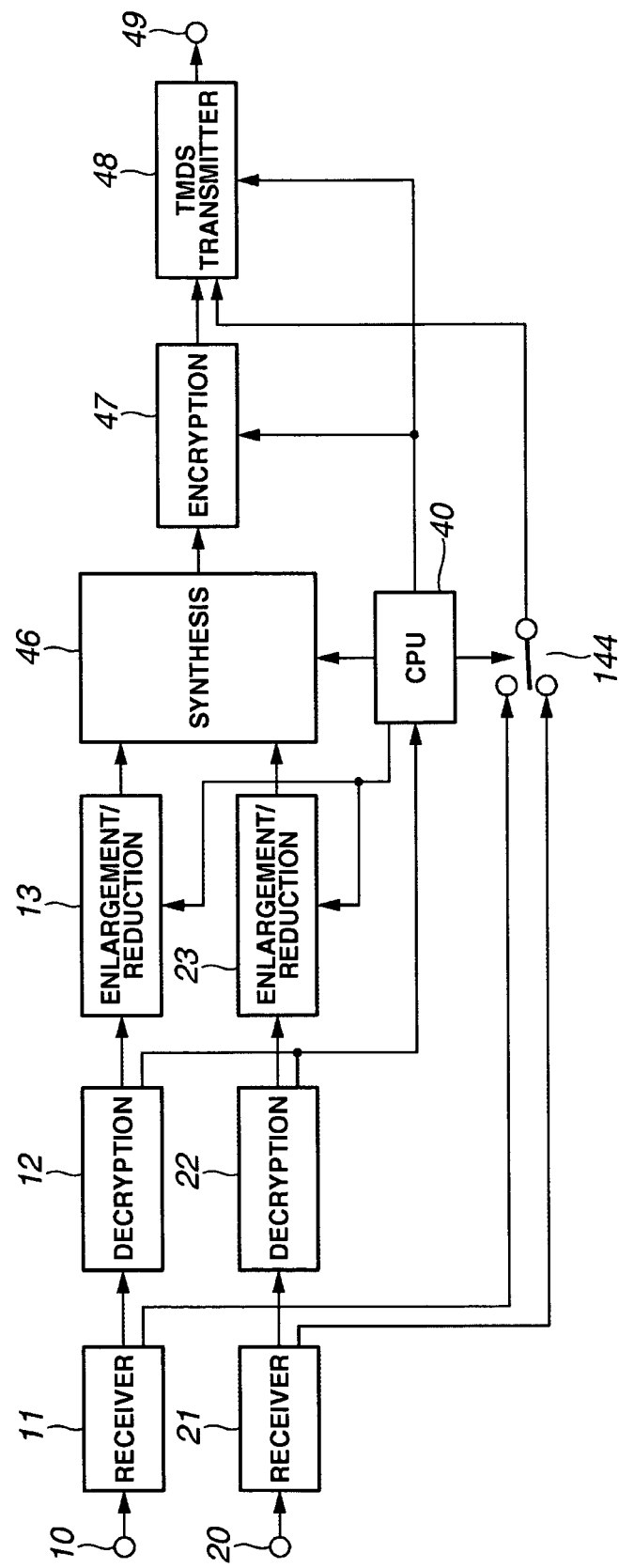
FIG. 1 is a block diagram of an image control apparatus in a first exemplary embodiment.
Figure 2:
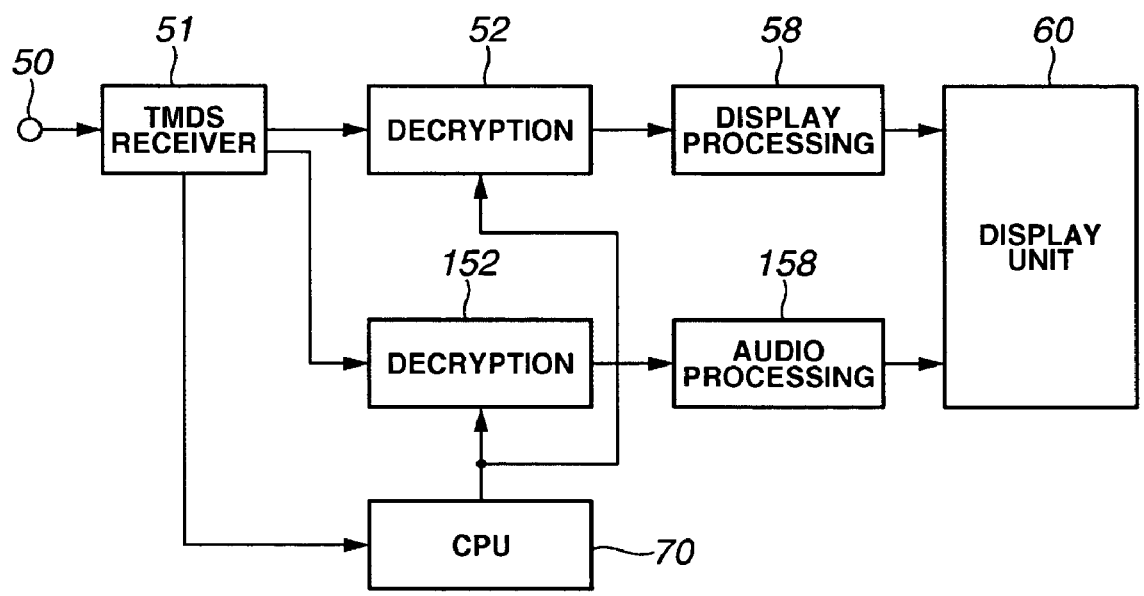
FIG. 2 is a block diagram of a display apparatus in the first exemplary embodiment.

FIG. 1 is a block diagram of the image control apparatus of a first exemplary embodiment, and FIG. 2 is a block diagram of a display apparatus communicating with the image control apparatus, for example via a cable or the like.

In FIG. 1, HDMI signals input to a first HDMI input terminal 10 and a second HDMI input terminal 20 from a plurality of video image sources are received by a first TMDS (Transition-Minimized Differential Signaling) receiver 11 and a second TMDS receiver 21 which constitute input portions respectively, and are separated into image data and audio data to be output. The image data are descrambled as the need arises by a first decryption block 12 and a second decryption block 22, and scramble area information is transmitted to an image control CPU 40. The packetized audio data is received and serialized by the first TMDS receiver 11 and the second TMDS receiver 21, and is sent to a switch 144. The image data released from the scramble by the first decryption block 12 and the second decryption block 22 are subjected to enlargement/reduction processing according to the instructions from the image control CPU 40 in a first resolution conversion block 13 and a second resolution conversion block 23. After that, the image data are subjected to multi-image synthesizing to generate synthesized image data. The synthesized image data is subjected to scramble processing according to instructions from the image control CPU 40 at a scramble processing unit (encryption block) 47 and is input to a TMDS transmitter 48. Further, according to the instructions from the image control CPU 40, the audio data selected by a switch 144 is also input to the TMDS transmitter 48. The TMDS transmitter 48 encodes the image data and the audio data, and the output is transmitted to the display apparatus from a transmission output terminal 49.

Next, the display apparatus will be described. In FIG. 2, a transmission signal from the image control apparatus is input to a transmission input terminal 50, and is received at a TMDS receiver 51 which is a display input unit. The TMDS receiver 51 transmits scramble area information to a display CPU 70. A decryption block 52 descrambles the image data under control of a display CPU 70. A display processing block 58 converts output from the decryption block 52 into a format which can be displayed by a display unit 60 and outputs it to the display unit 60 as re-transmission image data. The received audio data is transmitted to an audio data decryption unit 152. The output from the audio data decryption unit 152 is also subjected to a signal processing so as to reproduce audio in an audio processing block 158 and is output to an audio reproduction device (not shown).

Figure 3:
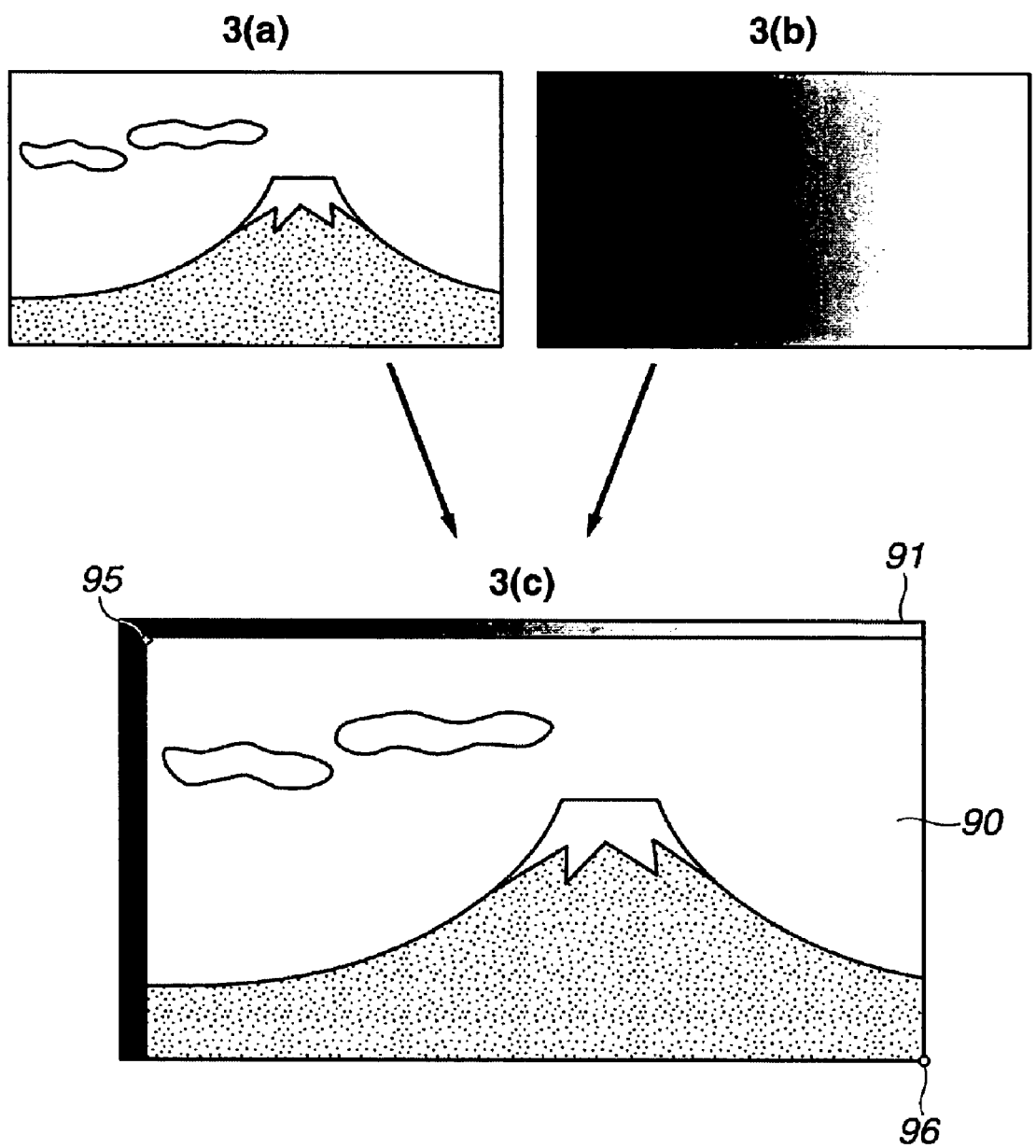
FIG. 3 is a display example of a re-transmission image in the first exemplary embodiment.

Consider the HDMI signals that are input from the first HDMI input terminal 10 and the second HDMI input terminal 20 of FIG. 1. Assuming that only one signal, for example, the signal input from the first HDMI input terminal 10 has been processed with protection such as scrambling. In this case, the image control CPU 40 issues an instruction to the scramble processing unit 47. According to the instruction, scrambling is applied only to the display portion from the first HDMI input terminal 10 from among the display images subjected to the multi-image synthesizing by the image synthesizing unit 46. At the same time, the image control CPU 40 transmits scramble area information indicating an area applied with a scramble to the TMDS transmitter 48 with a control code. This control code is a signal that can be transmitted only during a blanking period without any effective image data, and delivers a diagonal pixel address equivalent to the top left and the bottom right of the scramble area during a vertical blanking period. That is, the scramble area information is notified for every predetermined frame. For example, at the starting point of one frame (one field in the case of an interlaced scan), the scramble area of the image data subsequent to this frame can be transmitted. In the case of the image 3(c) of FIG. 3, the top left, that is, X and Y coordinates of a start point 95 and the bottom right, that is, X and Y coordinates of an end point 96 are transmitted. Alternatively, the X and Y coordinates of the start point 95 and the number of pixels in horizontal/vertical two directions from the start point 95 may be transmitted. In the present embodiment, the scramble area information designating the area subjected to the scramble processing is notified to the display apparatus. However, conversely, no-scramble area information designating the area which is not subjected to scramble processing may be notified to the display apparatus. Further, both the scramble area information and the no-scramble area information may be notified to the display apparatus.

As a matter of course, when the scramble is applied to the whole screen, the start point and the end point addresses (X, Y) where the whole screen becomes a scramble area are transmitted. Further, in a case where the whole screen is not applied with a scramble at all, the start point/the end point addresses (0, 0) are transmitted.

The CPU 40 determines which audio input is to be reproduced, that is, the audio input from the first HDMI input terminal 10 or the second HDMI input terminal 20, and accordingly controls the switch 144 which is an audio selection unit. The audio data from the selected audio input is sent with the copy protection information to the TMDS transmitter 48. After packetization, the audio data is transmitted to the display apparatus through the transmission output terminal 49 with the image data from an encryption block 47, together with control code.

The display apparatus receives audio data, image data, and control code from the image control apparatus. The display CPU 70 (FIG. 2) issues a decryption instruction to the decryption block 52. The decryption block 52 takes a rectangular area bounded by two addresses indicated by the control code as a scramble area, and appropriately performs descramble processing.

The transmission of the scramble area information may be performed for every one vertical period, or performed only when a change has arisen. Alternatively, the transmission may be periodically performed, for example, at intervals of 128 frames.

Up to this point, a case has been described where signals are input through the first HDMI input terminal 10 and the second HDMI input terminal 20. However, the present invention is not limited to the video image source of the HDMI input. The present invention can be also applied to, for example, a signal from a tuner having protection such as scramble broadcast and the reproduced signal from package software stored in the DVD.

Second Embodiment

Figure 4:
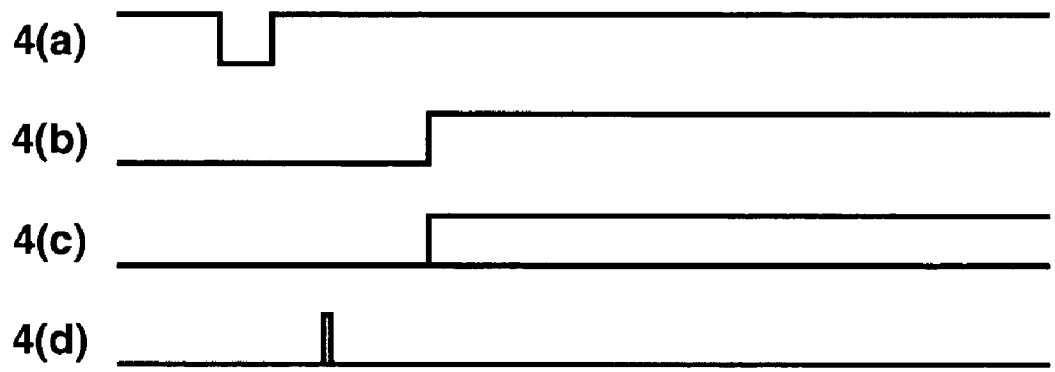
FIG. 4 is a timing chart of re-transmission image data in a second exemplary embodiment.

A second embodiment is now described which is different from the first embodiment in the method of notifying scramble area information to the display apparatus. FIG. 4 is a timing chart showing the output timing of synthesized image data outputted from a TMDS transmitter 48. In FIG. 4, reference numeral 4(a) denotes a horizontal synchronizing signal, reference numeral 4(b) an enable signal, reference numeral 4(c) image data, and reference numeral 4(d) a signal including a control code transmitting scramble area information. The control code is a code indicating an address in a horizontal direction. The control code transmits the scramble start point and the endpoint of pixels on the scanning line for each scanning.

Alternatively, the scramble start position and the number of pixels up to end position may be transmitted for each scanning.

In either case, "0" may be transmitted to the scanning line which does not require the scramble, for both the start point and the end point.

Third Embodiment

Figure 5:
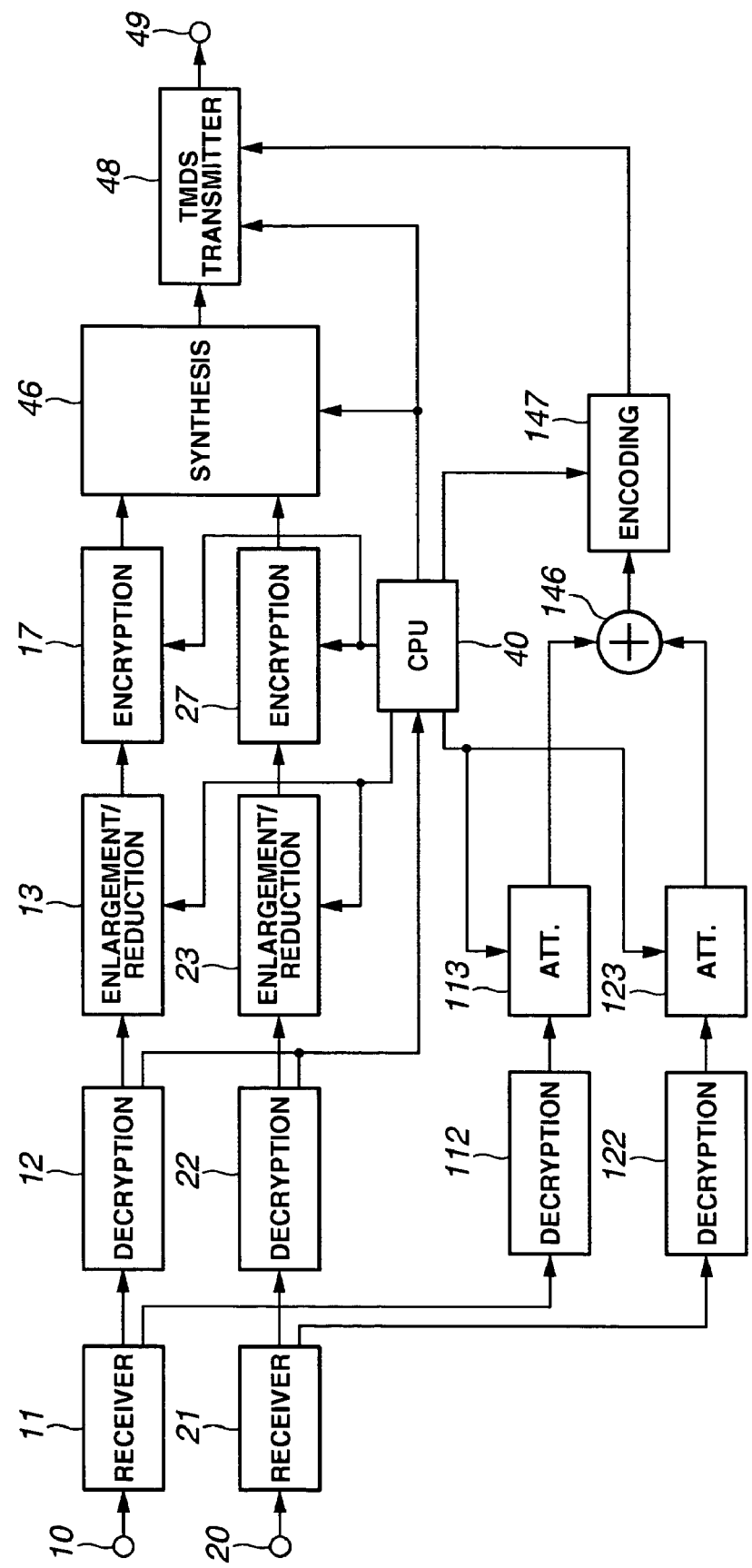
FIG. 5 is a block diagram of an image control apparatus in a third exemplary embodiment.
Figure 6:
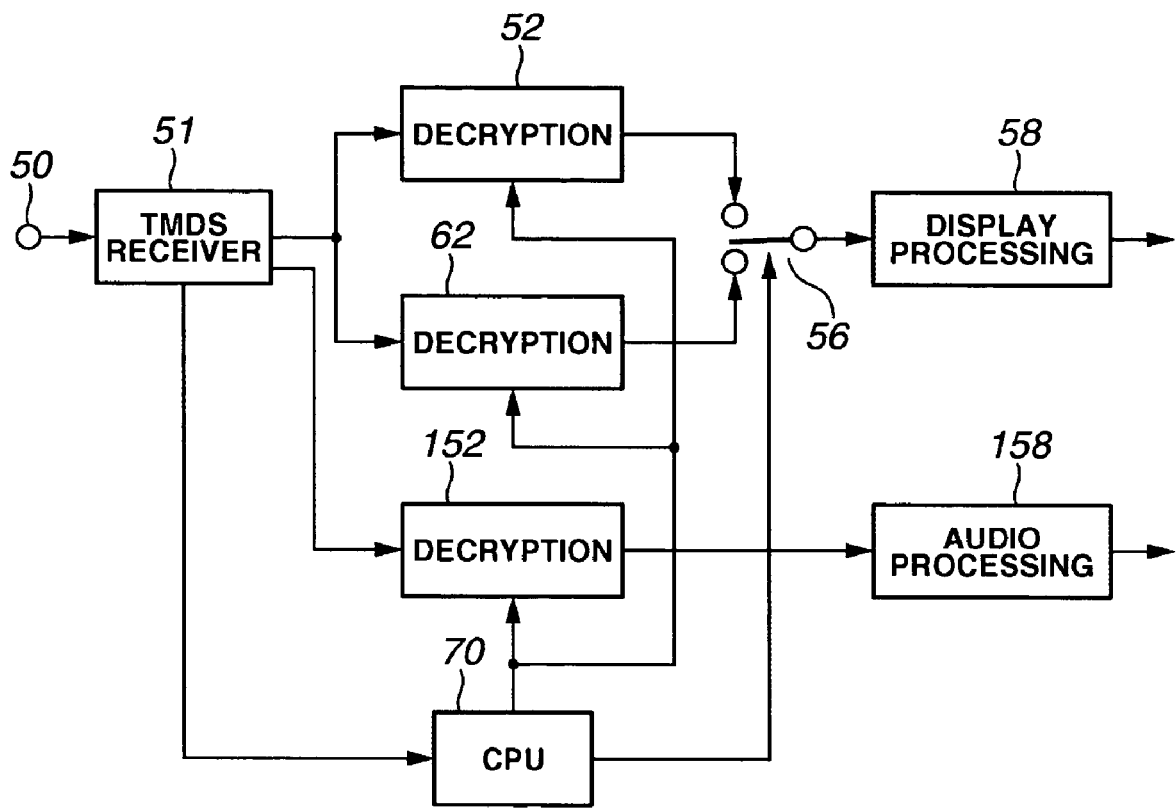
FIG. 6 is a block diagram of a display apparatus in the third exemplary embodiment.

A block diagram of an image control apparatus according to a third embodiment of the present invention is shown in FIG. 5, and a block diagram of a display apparatus is shown in FIG. 6, respectively.

The processing of the image data in the image control apparatus is the same as in the first and second embodiments up to enlargement/reduction processing in first and second resolution conversion blocks 13 and 23. The output data from the first and second resolution conversion blocks 13 and 23 are subjected to scramble processing using mutually independent and different code keys at a first system encryption block 17 and a second system encryption block 27. The image data which is subjected to scramble processing is multi-image synthesized at the image synthesizing unit 46, and is sent to the TMDS transmitter 48.

On the other hand, the audio data from the first and second TMDS receivers 11 and 21 are descrambled at a first audio decoding block 112 and a second audio decoding block 122 respectively. The descrambled audio data are subjected to audio volume adjustment according to instruction from an image control CPU 40 at a first attenuator 113 and a second attenuator 123 which are volume adjustment units respectively. After that, the descrambled audio data are mixed at an audio mixing unit 146. Then, the descrambled audio data are subjected to audio content protection processing such as addition of copy protection information at an audio encoder 147 and are sent to the TMDS transmitter 48. The audio encoder 147 serves as an audio processing unit. The TDMS transmitter 48 encodes this audio data and the synthesized image data together with a control code including scramble area information from the image control CPU 40. The TDMS transmitter 48 transmits the data to the display apparatus through a transmission output terminal 49.

Figure 7:
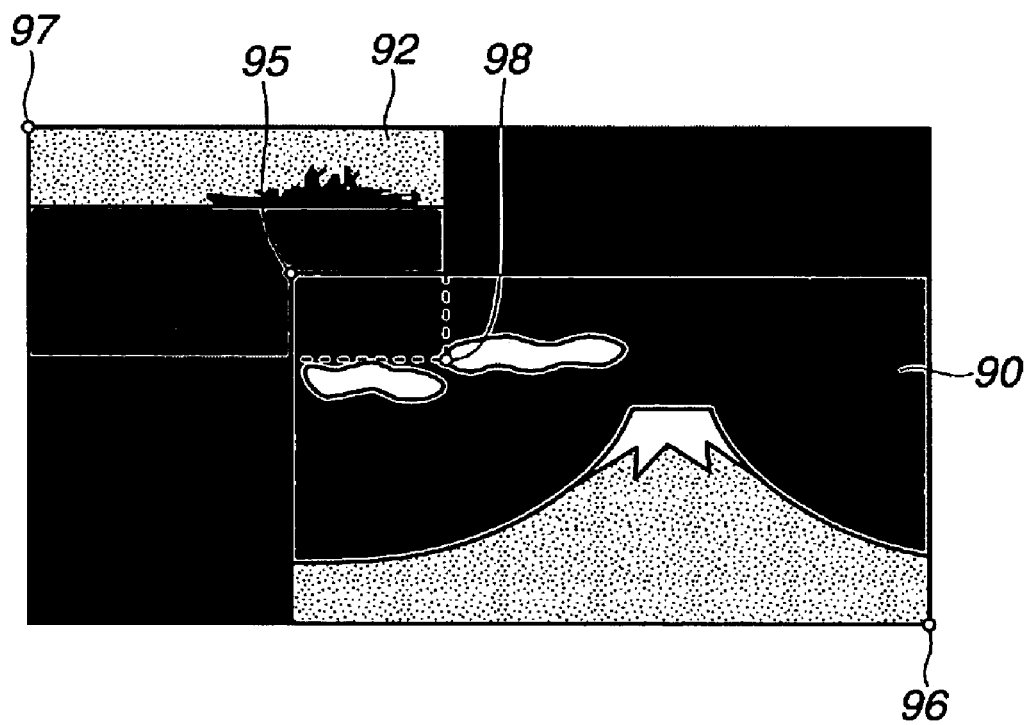
FIG. 7 is a display example of the re-transmission image in the third exemplary embodiment.

A method of transmitting scramble area information included in the control code will be described by using the multi-image synthesizing example of FIG. 7. Similarly to FIG. 3, an image 90 and an image 92 are reduced, and the image 90 is synthesized so as to be disposed at a top layer (front face layer). In this case, a start point address coordinate of the image 92 is 97, and this designation method is the same as the first embodiment. However, the end point address of the image 92 is disposed underneath the image 90. The end point address coordinate 98 is still used in this case (i.e. the end point address coordinate 98 is assumed to be disposed on top of the image 90. The information that the image 90 is a top layer when display images are superimposed is transmitted together with the start and end points address coordinate information.

The display apparatus includes the decryption blocks 52 and 62 shown in FIG. 6 corresponding to the image data. The individual image data streams are encrypted by respective different scramble keys. The display apparatus switches over a switch 56 for each area based on the scramble area information.

The image control CPU 40 in FIG. 5 designates respective attenuating amounts for the first attenuator 113 and the second attenuator 123. The image control CPU 40 determines which image input is a main image, that is, whether input from the input terminal 10 or input from the input terminal 20, based on the window size, or whether the layer is a top layer or a bottom layer. The CPU 40 selects the audio corresponding to the main image as main audio and the audio corresponding to the sub image as sub audio. According to the display example shown in FIG. 7, the audio corresponding to the image 90 is taken to be main audio, and the audio corresponding to the image 92 is taken to be sub audio. The sub audio is mixed with the main audio. The sub audio is set to have a lower volume level than the main audio.

Fourth Embodiment

Figure 9:
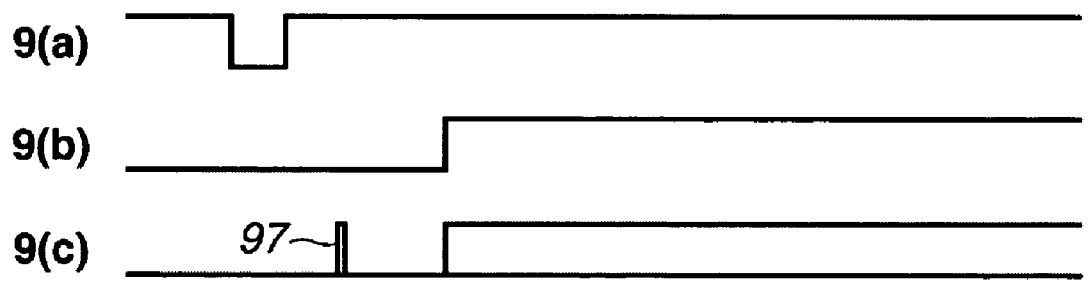
FIG. 9 is a timing chart of the re-transmission image data in the fourth exemplary embodiment.
Figure 8:
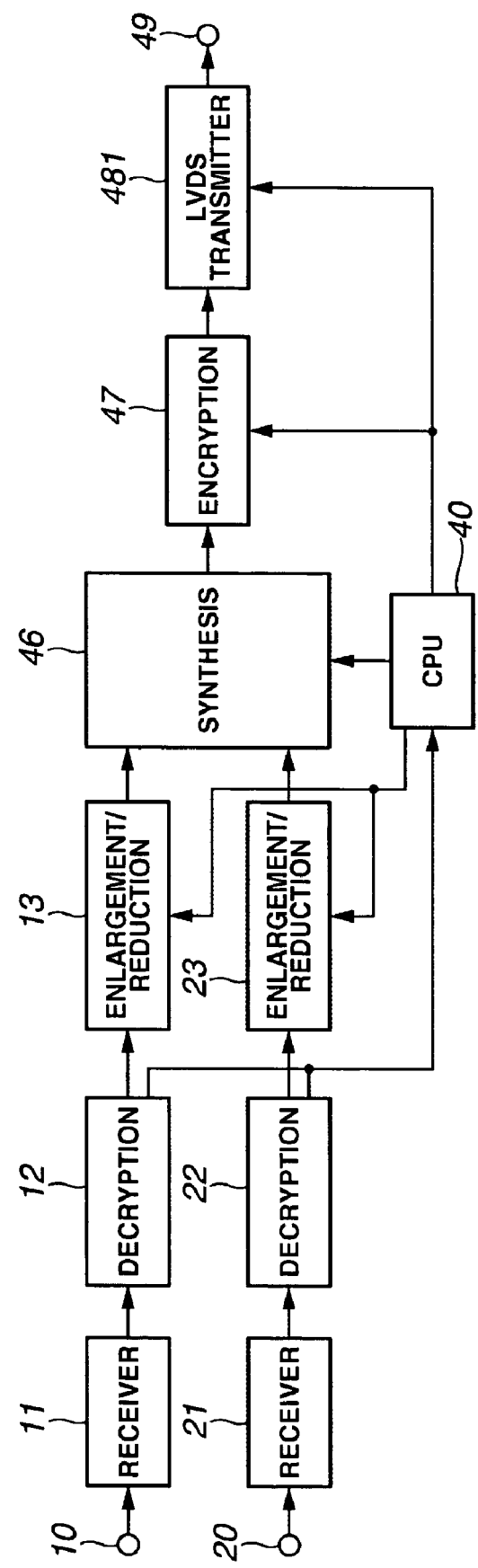
FIG. 8 is a block diagram of an image control apparatus in a fourth exemplary embodiment.

A block diagram of an image control apparatus of a fourth embodiment of the present invention is shown in FIG. 8. In FIG. 8, the equivalent circuit blocks to those shown in FIGS. 1 and 5 have the same reference numerals. The difference from the first, second and third embodiments is that the method of transmission to the display apparatus employs an LVDS (Low-Voltage Differential Signaling) transmission. The TMDS transmits only image data during an enable period, and only a control code or audio data during a blanking period. However, the LVDS has no such limitation. FIG. 9 shows an output timing diagram of synthesized image data transmitted to the display apparatus by the LVDS. In FIG. 9, reference numeral 9(a) denotes a horizontal synchronizing signal, reference numeral 9(b) an enable signal, and reference numeral 9(c) the synthesized image data. As shown in reference numeral 9(c), a code 97 designating scramble area information is transmitted being superposed on the image data of a horizontal image blanking period generally defined in the field of video technology.

Similarly to the second embodiment, the code 97 indicates an address in a horizontal direction only and transmits the scramble start point and the end point in that line for each line scanning. Also in this case, "0" is transmitted to both the start point and the end point in the line where no scramble is necessary.

Fifth Embodiment

FIG. 10 is a block diagram of an image control apparatus according to a fifth embodiment. Components having the same functions as those shown in FIGS. 1, 5, and 8 have the same reference numerals. The difference from the first, second, third and fourth embodiments is that an OSD (On-Screen Display) generator 35 is added.

The OSD generator 35 generates a screen display character signal for the image synthesizing unit 46 based on an instruction of an image control CPU 40. The image synthesizer 46 adds a scramble signal to enable determination of whether a scramble should be applied to each pixel, and outputs the scramble signal to the scramble processing unit 47. The scramble processing unit 47 performs the scramble processing for each pixel based on the scramble signal. Synthesized image data subjected to this scramble processing is outputted to the display apparatus from an LVDS transmitter 481 together with the scramble signal as horizontal/vertical synchronizing signals and scramble area information. That is, the scramble area information includes the determination information as to whether the scramble processing is applied to each pixel. The scramble area information is notified to the display apparatus together with the image data value of each pixel.

Figure 11:
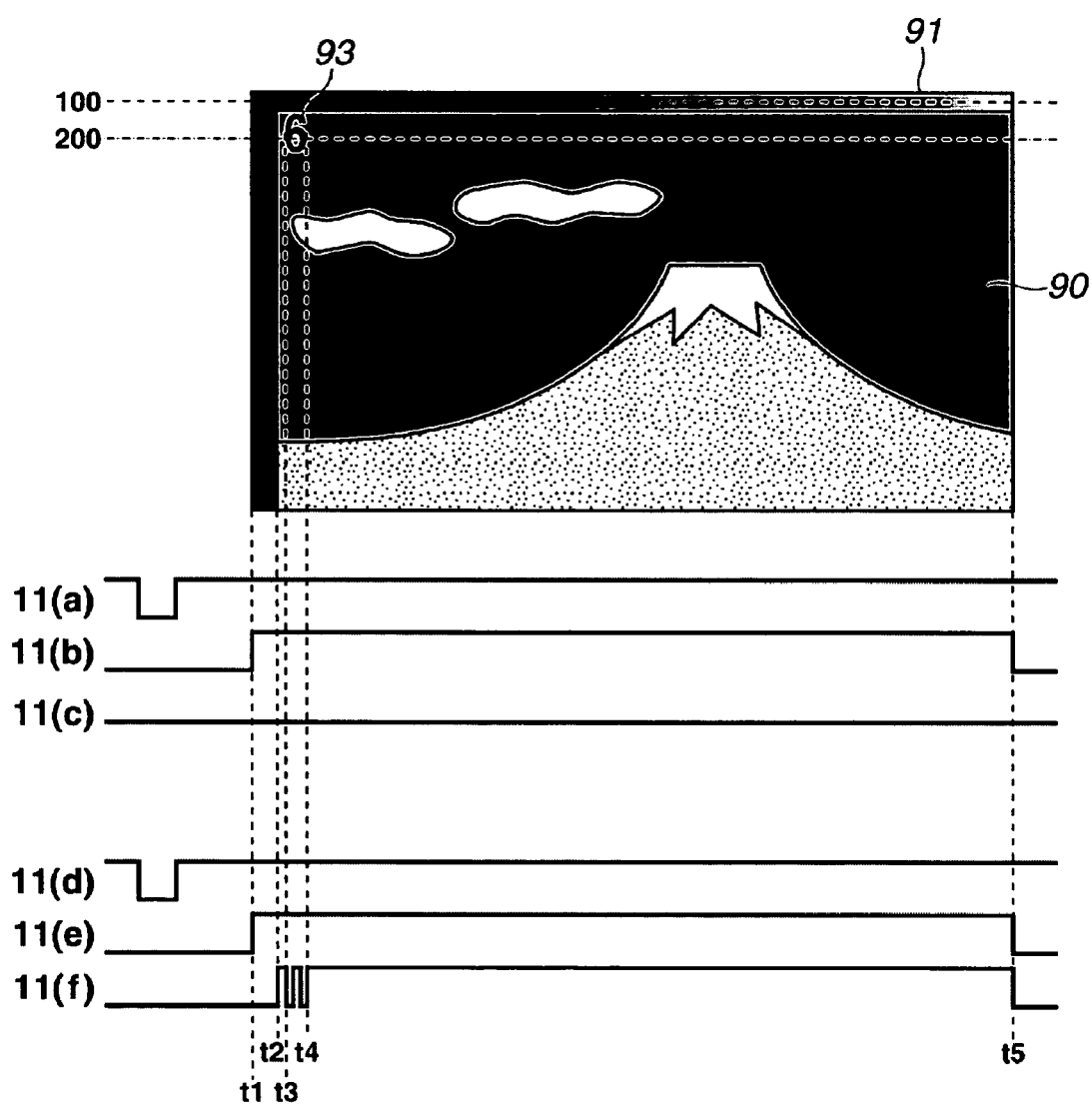
FIG. 11 is a display example of the re-transmission image and a timing chart of the re-transmission image data in the fifth exemplary embodiment.

A relationship between a display image and signal timing is shown in FIG. 11. A synthesized display image is composed of an image area 91 which does not require content protection, an image area 90 requiring content protection, and a superposed OSD 93. In the pixels on a line shown by broken line 100 on the display image, a horizontal synchronizing signal, an enable signal, and a scramble signal are input at the times shown in 11(a) to 11(c) respectively. Similarly, in the pixels on a line shown by a broken line 200, a horizontal synchronizing signal, an enable signal, and a scramble signal are input at the times shown in 11(d) to 11(f) respectively.

In the pixels on the line which does not require scrambling as shown in the broken line 100, the scramble processing is not applied to any pixel as shown in 11(c). On the other hand, when the pixels on the line require scramble processing as shown in the broken line 200, the information indicating the presence or absence of the scramble processing is included in a pixel unit in the scramble area information as shown in 11(f).

In 11(f), reference numeral t1 denotes timing when an effective image range starts, reference numeral t2 denotes timing to switch over from an image which does not require the scramble to an image requiring the scramble, reference numerals t3 to t4 denote timing equivalent to an OSD display portion, and reference numeral t5 denotes timing when the effective image range terminates. In this manner, during the period from t2 to t5 requiring the scramble processing, only with respect the pixel which is not superposed with the OSD, the scramble signal becomes "H", and the scramble processing is applied.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-109894 filed Apr. 6, 2005, which is hereby incorporated by reference herein in its entirety.

What is claimed is:

1. An image control apparatus for synthesizing an image based on a plurality of video image sources and displaying the synthesized image on a display apparatus, the apparatus comprising:
   a processor configured to provide control instructions;
   an input unit configured to input a first video image source having content protection and a second video image source having no content protection;
   an image synthesizing unit configured to generate synthesized image data from the first video image source and the second video image source;
   a scramble processing unit configured to receive control instructions from the processor to apply scramble processing to the synthesized image data corresponding to a display portion of the synthesized image based on the first video image source having content protection and configured not to apply the scramble processing to the synthesized image data that corresponds to the display portion of the synthesized image based on the second video image source having no content protection; and
   an output unit configured to output the synthesized image data.

2. A display apparatus displaying an image based on synthesized image data generated from a plurality of video image sources, the apparatus comprising:
   a processor configured to provide control instructions;
   a display inputting unit configured to input the synthesized image data and at least one of scramble area information designating an area subjected to the scramble processing and no-scramble area information designating an area not subjected to the scramble processing; and
   a display unit configured to receive control instructions from the processor to display the synthesized image,
   wherein the synthesized image data is generated from a first video image source subjected to scramble processing and a second video image source subjected to no scramble processing,
   wherein the synthesized image data that corresponds to the display portion of the synthesized image based on the first video image source is subjected to descramble processing according to the scramble information designating the area subjected to scramble processing, and
   wherein the synthesized image data that corresponds to the display portion of the synthesized image based on the second video image source is not subjected to descramble processing according to the no-scramble area information designating the area not subjected to the scramble processing.

3. The image control apparatus according to claim 1, wherein the image control apparatus comprises a scramble area information transmitting unit configured to transmit to the display apparatus at least one of scramble area information designating an area to be subjected to the scramble processing and no-scramble area information designating an area not to be subjected to the scramble processing.

4. The image control apparatus according to claim 3, wherein the scramble area information transmitting unit is configured to transmit at least one of the scramble area information and the no-scramble area information to the display apparatus separately from the synthesized image data transmitted to the display apparatus by the output unit.

5. The image control apparatus according to claim 3, wherein the scramble area information transmitting unit is configured to transmit at least one of the scramble area information and the no-scramble area information to the display apparatus during a blanking period in which the synthesized image data is not transmitted to the display apparatus by the output unit.

6. The image control apparatus according to claim 3, wherein the area to be subjected to the scramble processing is a rectangle, and the scramble area information includes coordinates of two diagonal vertices of the rectangle.

7. The image control apparatus according to claim 3, wherein new scramble area information is notified when a display layout is changed.

8. The image control apparatus according to claim 3, wherein the scramble area information is notified for selected frames.

9. The image control apparatus according to claim 3, wherein the scramble area information includes information determining whether scramble processing is applied to each pixel and said information is notified together with an image data value of each pixel.

10. The image control apparatus according to claim 9, further comprising an on screen display (OSD) generator which provides pixel data to a display unit without scrambling.

11. The image control apparatus according to claim 1, further comprising:
    an audio selection unit configured to select audio data accompanying a main video image source from among the first and second video image sources, and
    an audio processing unit configured to apply a copy protection processing to the selected audio data.

12. The image control apparatus according to claim 1, further comprising:
    an audio mixing unit configured to mix the audio data accompanying a secondary image source with the audio data accompanying a main video image source from among the first and second video image sources at a predetermined or selected ratio;
    an audio processing unit configured to apply the copy protection processing to the mixed audio data; and
    an audio volume adjusting unit configured to change a ratio of mixing the audio data.

13. The image control apparatus according to claim 11, wherein the main video image source is selected based on an area of a display portion.

14. The image control apparatus according to claim 11, wherein the main video image source is selected based on the topmost display portion.

15. An image display system comprising an image control apparatus outputting synthesized image data generated from a plurality of video image sources and a display apparatus displaying the image based on the synthesized image data, wherein the image control apparatus comprises:
    a processor configured to provide control instructions:
    an input unit configured to input a first video image source applied with content protection and a second video image source applied with no content protection;
    an image synthesizing unit configured to generate the synthesized image data from the first video image source and the second video image source;
    a scramble processing unit configured to receive control instructions from the processor to apply scramble processing to the synthesized image data corresponding to the display portion of the synthesized image based on the first video image source having content protection and not to apply the scramble processing to the synthesized image data that corresponds to the display portion of the synthesized image based on the second video image source having no content protection; and
    an output unit configured to output the synthesized image data,
    wherein the display apparatus includes:
    a display input unit configured to input the synthesized image data; and
    a display unit configured to apply a descramble processing to the synthesized image data that corresponds to the display portion of the synthesized image based on the first video image source and to display the synthesized image.

16. An image control apparatus synthesizing an image based on a plurality of video image sources and displaying the synthesized image on a display apparatus, the apparatus comprising:
    a processor configured to provide control instructions;
    an input unit configured to input a first video image source applied with content protection and a second video image source applied with no content protection;
    an image synthesizing unit configured to generate synthesized image data from the first video image source and the second video image source;
    scramble processing unit configured to receive control instructions from the processor to apply a first scramble processing to the synthesized image data that corresponds to the display portion of the synthesized image based on the first video image source having content protection and to apply a second scramble processing different from the first scramble processing to the synthesized image data that corresponds to the display portion of the synthesized image based on the second video image source having no content protection; and
    an output unit configured to output the synthesized image data.

17. A display apparatus displaying an image based on synthesized image data generated from a plurality of video image sources, the apparatus comprising:
    a processor configured to provide control instructions;
    a display input unit configured to input the synthesized image data and at least one of first scramble area information designating an area subjected to first scramble processing and second scramble area information designating an area subjected to second scramble processing; and
    a display unit configured to receive control instructions from the processor to display the synthesized image,
    wherein the synthesized image data is generated from a first video image source subjected to a first scramble processing and a second video image source subjected to a second scramble processing; and
    wherein a first descramble processing is applied to the synthesized image data that corresponds to the display portion of the synthesized image based on the first video image source according to the first scramble information designating the area subjected to first scramble processing, and a second descramble processing is applied to the synthesized image data that corresponds to the display portion of the synthesized image based on the second video image source according to the second scramble information designating the area subjected to the second scramble processing.

18. A control method for an image control apparatus synthesizing an image based on a plurality of video image sources and displaying the synthesized image on a display apparatus, the method comprising steps of:

using a processor to perform the following:

inputting a first video image source having content protection and a second video image source having no content protection;

generating synthesized image data from the first video image source and the second video image source;

applying a scramble processing to the synthesized image data that corresponds to the display portion of the synthesized image based on the first video image source having content protection;

applying no scramble processing to the synthesized image data that corresponds to the display portion of the synthesized image based on the second video image source having no content protection; and outputting the synthesized image data.

* * * * *